Aug. 19, 1969     W. P. SOMERS     3,462,585
ELECTRICALLY HEATED BEDCOVER CONTROL
Filed May 3, 1966
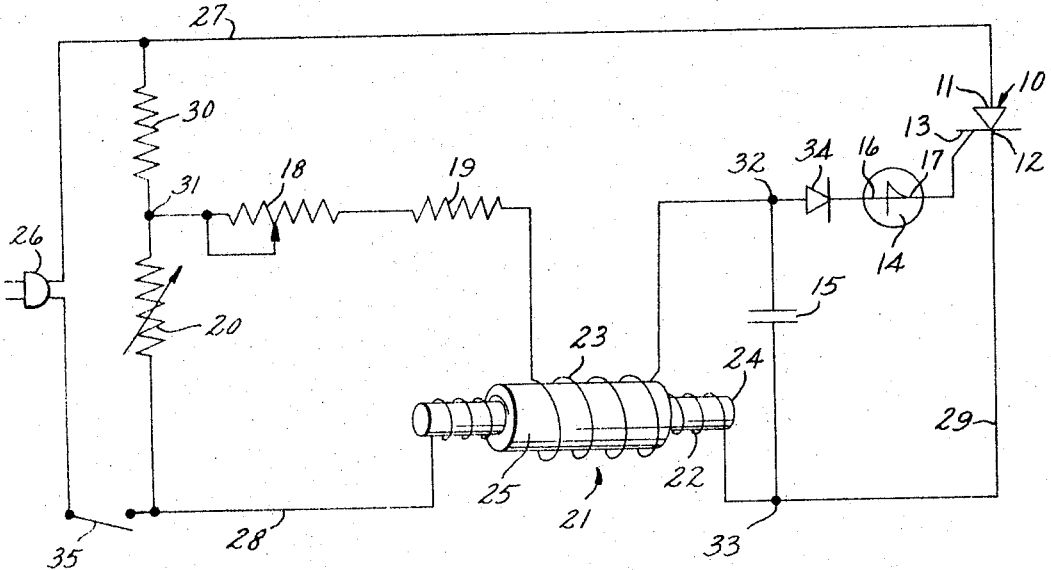
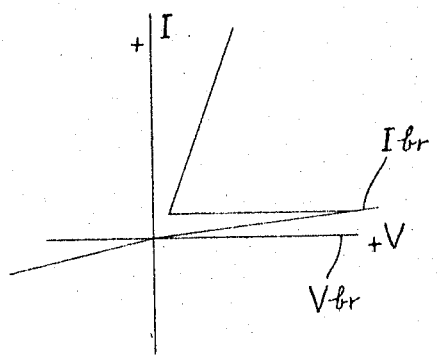
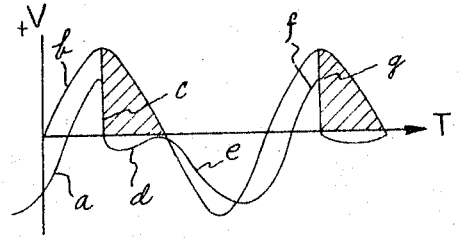
Inventor:
William P. Somers
by Lawrence R. Kempton
Attorney United States Patent Office 3,462,585
Patented Aug. 19, 1969

3,462,585
ELECTRICALLY HEATED BEDCOVER CONTROL
William P. Somers, Prospect Heights, Ill., assignor to General Electric Company, a corporation of New York
Filed May 3, 1966, Ser. No. 547,295
Int. Cl. H05b 1/02
U.S. Cl. 219—501                                    8 Claims

ABSTRACT OF THE DISCLOSURE

This disclosure concerns controlling an electrically heated bedcover that has distributed through it both an electrical heater and a temperature sensing material having the characteristics of an insulator at normal operating temperatures and an electrical conductor at elevated temperatures. The electrical heater of the bedcover is regulated by a semiconductor control device which will, upon an applied signal, permit alternating current to flow to the heater. The temperature sensing material is connected to the signal applying means in shunt relationship so that when an overtemperature condition exists, the signal is not applied to the semiconductor control device and no current can flow to the heater.

---

The present invention relates to controls for electrically heated bedcovers.

Electrically heated bedcovers, in simplest form, have a resistance heater wire distributed throughout the bedcover and a switch for permitting the user to open or close the circuit through the heater wire. In addition, however, it has been found necessary from the standpoint of safety, to provide means to interrupt the current flow to the heater if an overtemperature condition should occur. An overtemperature condition may occur due to folding or bunching of the bedcover in a manner which concentrates the heat from the heater and prevents normal escape of the heat to the surrounding air. If such an overtemperature condition should occur it is necessary that it be automatically detected so as to open the circuit to the blanket heater before the temperature reaches such proportions as might cause scorching of the fabric. Prior controls which accomplish interruption of current flow to the bedcover heater in accordance with the occurrence of an overtemperature condition have generally utilized relays having contacts which are engaged or disengaged depending on the existence of the condition. It would be desirable to eliminate the need for moving parts, occasioned by the use of the aforementioned relays, and to control, through a switch having no moving parts, the current supplied to the bedcover heater accordance with the existence of an overtemperature condition. Electrically heated bedcover controls also desirably have automatic means to change the heat output accordance with variations in ambient room temperature, and they also have means to permit the operator to select a desired heat output in accordance with individual preference.

It is an object of the present invention to provide an electrically heated bedcover control which utilizes a semiconductor device as a switch to control the electrical current flow through the bedcover heater in accordance with the existence of an overtemperature condition so as to minimize the moving parts and take advantage of the efficiency, reliability and small size inherent in semiconductor devices.

It is a further object of the present invention to provide an electrically heated bedcover control in which a single switch, in the form of a semiconductor, is actuated in accordance with ambient temperature conditions, operator selection and bedcover overtemperature conditions to regulate the current supplied to the bedcover heater.

Briefly stated, in accordance with one aspect of my invention, I provide a semiconductor device which has two power terminals connecting the device in electrical series with a bedcover heater wire. This semiconductor device permits electrical current to flow only during the remaining portion of each half cycle after a signal pulse has been applied to the device to turn the device "on." Means in the nature of a flexible material having a negative temperature coefficient of resistance is provided in a control circuit to sense overtemperature which might occur at any area throughout the bed cover, and this means is electrically connected to a signal pulse supplying means in such a manner that no signal pulse can be applied if an overtemperature condition exists. As another aspect I also utilize ambient temperature sensing means and operator selector means together with the overtemperature sensing means in the same control circuit to permit regulation of the time when the semiconductor control device receives a signal pulse also in accordance with ambient temperature and operator selection.

Other objects and advantages of my invention may best be understood by referring to the following description taken in connection with the accompanying drawing in which:

FIG. 1 is a diagrammatic view of an electric bedcover circuit and control means incorporating my invention.

FIG. 2 is a voltage versus current characteristic curve of a triggering device used in the circuit of FIG. 1.

FIG. 3 illustrates waveforms of voltage with respect to time across the capacitor used in the circuit of FIG. 1 and across the power supply lines.

Before going into a description of the electrical circuit and the manner in which the control operates, it may be helpful to describe certain of the elements used in the circuit of a preferred embodiment as illustrated at FIG. 1.

For a semiconductor control device 10 I have used a silicon controlled rectifier having an input terminal 11, an output terminal 12 and a control terminal 13. This device is characterized by its high impedance to current flow in both directions unless a signal pulse is applied to the control terminal. After a signal pulse has been applied to the control terminal, the device will present a low impedance path for current flow between input terminal 11 and output terminal 12 only as long as the voltage on the input terminal is positive with respect to the voltage on the output terminal. The device does not permit current flow in a direction between output terminal 12 and input terminal 11.

Means used to supply this signal pulse to the control terminal 13 includes a triggering device 14 and a capacitor 15. The triggering device has input and output electrodes 16 and 17, and is characterized by a current versus voltage curve plotted at FIG. 2. Very little current can flow through the device 14 until a breakdown voltage, $V_{br}$, is reached. When this breakdown voltage is reached, about 20 volts in the present embodiment, voltage across the electrodes 16 and 17 drops to a low value and the current passed rises steeply to furnish a sufficient pulse to the control terminal 13 to turn, in effect, the semiconductor control device 10 "on" and permit current flow between terminals 11 and 12. For the device 14, I have used what is commonly known as a Shickley diode; however, other triggering devices having similar current versus voltage charcteristics such as a Zener diode or a neon lamp, may be used. The capacitor 15 which I have used has a rating of .02 microfarad.

It will be appreciated by one skilled in the art that there are other semiconductor control devices which could be substituted for the semiconductor control device 10 illustrated. One such substitution could be a device commonly known as a triac which permits current flow in either of opposite directions only during the remaining portion of a half cycle after a signal pulse has been applied to a control terminal associated therewith. Similarly a device commonly known as a diac or biswitch could be used which can obtain its signal pulse from a triggering device operating through a pulse transformer electrically connected to one of the power terminals of the diac; and, when so pulsed, conducts current during the remaining portion of a half cycle after the pulse has occurred.

An operator comfort selector means 18 having a resistance manually adjustable between zero and 250 kilohms permits the user to manually vary the heat from the bedcover. A fixed resistance 19 having a value of about 820 kilohms is use to limit the effective minimum resistance setting of the comfort selector 18.

Ambient temperature responsive means 20 is provided in the form of a thermistor having a negative temperature coefficient of resistance. I have used a thermistor which has resistance values of approximately 105 kilohms at 77° F., 210 kilohms at 55° F. and about 390 kilohms at 32° F.

A flexible heating and overtemperature sensing wire 21 which I have used in successful operation of the present invention includes a heating conductor 22 and a control conductor 23. The heating conductor is wound helically on an insulating core 24. An overtemperature sensing material layer 25 separates the heating conductor 22 from the control conductor 23. The layer 25 has a negative temperature coefficient of resistance in that it is essentially an insulator at normal temperatures of the bedcover, but it conducts currents of control magnitude at elevated temperatures which might be caused by existence of an overtemperature condition in the bedcover. The wire 21, in actual use, is distributed in a serpentine fashion throughout the bedcover. Reference may be had to U.S. Patent No. 2,581,212 issued on Jan. 1, 1952 to Spooner et al. and assigned to General Electric Company, the same assignee of the present application, for a more detailed description of a construction which may be used for the wire 21.

Now turning to a description of a preferred embodiment of an electrical circuit, as illustrated at FIG. 1, a connector plug 26 is used to connect power supply lines 27 and 28 across a normal 60 cycle alternating current household electrical supply outlet. The input terminal 11 of the semiconductor device 10 is electrically connected to the line 27, and the output terminal 12 is electrically connected to line 28 through an electrical conductor 29 and heating wire 22. A series circuit between the lines 27 and 28 includes a 15 kilohm fixed resistance 30 and the variable resistance element 20 described above. One side of the operator selector means 18 is connected at junction point 31 between the elements 20 and 30. A circuit from the other side of the operator selector means 18 leads through fixed resistance 19, sensor wire 23 and electrodes 16 and 17 of the triggering device 14 to the control terminal 13 of the semiconductor device 10. One side of the capacitor 15 is connected at point 32 in the circuit including the triggering device 14, and the other side of the capacitor is connected at point 33 to electrical conductor 29. A rectifier 34 is connected between point 32 and the triggering device 14 to prevent current from flowing in the reverse direction through the triggering device; therefore, the capacitor is allowed to charge in the reverse direction during half cycles when line 28 is more positive than line 27.

Operation of the circuit of FIG. 1 may be better understood by referring to FIG. 3, and it will be assumed that the connector 26 has been plugged into a household supply outlet, and a manually operated line switch 35 has been closed. The curve $b$ is a plot of the voltage with respect to time of the line 27 with respect to the line 28. The curve $a$ (not to the same scale) is the voltage of point 32 with respect to the point 33. It is further to be assumed, in the following description of the operation, that no overtemperature condition exists in the blanket; or, in other words, the material 25 is essentially an insulator. Now, again referring to FIG. 3, it is seen that the capacitor 15 will charge in a forward direction during positive half cycles when the line 27 is more positive than line 28. After a certain period of time in each positive half cycle, depending on the setting of the resistance 18 and the resistance of the ambient temperature responsive means 20, the voltage at point 32 reaches the breakdown voltage of the triggering device 14. The capacitor 15 then discharges through rectifier 34 and triggering device 14 to supply a pulse to the control terminal 13 of the semiconductor device 10. The voltage on the capacitor will then be at point $c$ on curve $a$, and current is permitted to flow through the semiconductor device 10 and through the heater wire 22 during the remaining portion of the half cycle when line 27 is more positive than line 28 (indicated by the cross-hatched portion of FIG. 3). As soon as line 28 becomes more positive than line 27, the semiconductor 10 is, in effect, turned "off" and no current can flow through the heating wire until the semiconductor 10 has again been triggered during the next positive half cycle. The excursion $d$ of the curve $a$ is due to the fact that when current is flowing through the semiconductor 10, the point 33 is essentially at the same voltage as line 27. Point 31 is at this time negative with respect to line 27 so capacitor 15 charges in the negative direction. As soon as line 28 becomes positive with respect to line 27 semiconductor device 10 ceases to conduct and the capacitor 15 will start to charge toward the voltage of point 31 with respect to line 28 resulting in negative excursion $e$ of curve $a$. During the next positive half cycle of curve $b$, capacitor 15 will continue to charge toward the voltage of point 31 with respect to the line 28, which is now a positive voltage, and this results in positive excursion $f$ of curve $a$. When this positive excursion reaches point $g$, the triggering device 14 again discharges capacitor 15 into the control terminal 13 and the semiconductor device 10 is again turned "on."

If the operator manually reduces the resistance of operator selector means 18, the capacitor 15 will charge more rapidly therefore causing a pulse to be applied to the control terminal 13 sooner in each positive half cycle so as to increase the average power to the heating wire 22. Increasing the resistance 18 will reduce the heat output of the heating wire.

As room temperature drops, the resistance of element 20 increases and so the voltage at point 31 with respect to line 28 will become higher; and, therefore, the capacitor 15 will be charging toward a higher voltage and will reach the voltage required to trigger the device 14 sooner during each positive half cycle and the heat from the bedcover is thereby increased. An increase in room temperature works, of course, in an opposite manner to reduce the heat from the bedcover.

As is clear from FIG. 1, the material 25 is in a shunt relationship with the capacitor 15. Therefore, if an overtemperature condition should exist in any portion of the bedcover, the layer of material 25 will become a conductor of sufficient current to prevent the capacitor from reaching a voltage sufficient to trigger the device 14, and no signal pulse is applied to the terminal 13. Thus, no current can flow through the heater wire 22 until the bedcover has cooled sufficiently for the material 25 to regain sufficient insulating properties to again permit the capacitor 15 to be charged to the breakdown voltage of triggering device 14.

One modification of the circuit of FIG. 1 would be to interchange the circuit position of the ambient temperature responsive means 20 and the operator selector means 18. If this were done, a material having a positive temperature coefficient of resistance would be used for the ambient temperature responsive means, and the operator selector means would utilize an increase in resistance to increase the average heat output of the bedcover.

It will be appreciated from the above that I have provided control means for an electrically heated bedcover which uses a single switch, in the form of a semiconductor device 10, to control the average heat output of the bedcover in accordance with ambient temperature conditions and operator comfort selection; and the same switch is electrically connected to an overtemperature sensing means 25 to turn the bedcover "off" if an overtemperature condition should exist. Furthermore, once the control has been turned "on" by the manual switch 35 and the user has adjusted the position of the comfort selector 18 to a desired value, the control automatically responds to ambient temperature changes and overtemperature conditions with no moving parts.

While I have shown and described specific embodiments of my invention, I do not desire my invention to be limited to the specific forms shown and described. Instead, I intend by the appended claims to cover all modifications within the spirit and scope of my invention.

What I claim is:

1. Control means for an electrically heated bedcover of the type having an electrical heater connected across an alternating current source of electrical power and distributed through the bedcover, and flexible temperature sensing means within the bedcover which is essentially an insulator at normal operating temperatures and a conductor of currents of control magnitude at an elevated temperature, said control means comprising:
   (a) a semiconductor control device having at least two terminals in electrical circuit with the heater to regulate power supplied to the blanket heater, said device permitting current flow between said terminals only during the remaining portion of each half cycle after a signal pulse has been applied to said semiconductor control device;
   (b) means for applying a signal pulse to said semiconductor control device; and
   (c) said temperature sensing means being electrically connected to said signal pulse applying means in shunt relationship to prevent said signal pulse applying means from applying a signal pulse to said semiconductor control device when an overtemperature condition exists in said bedcover.

2. Control means for an electrically heated bedcover of the type having an electrical heater connected across a source of electrical power and distributed through the bedcover and temperature sensing means within the bedcover which is essentially an insulator at normal operating temperatures and a conductor of currents of control magnitude at an elevated temperature, said control means comprising:
   (a) a semiconductor control device having at least two terminals to regulate power supplied to the blanket heater and at least one other terminal operating to control conduction through said semiconductor device;
   (b) a first input means for said control terminal responsive to the impedance of the temperature sensor within the bedcover to cut off conduction through said semiconductor device upon the existence of an overtemperature condition;
   (c) a second input to said control terminal responsive to ambient temperature to change the amount of conduction through said semiconductor device inversely to changes in ambient temperature; and
   (d) a third input to said control terminal to increase or decrease conduction through said semiconductor device responsive to operator selection.

3. Control means for an electrically heated bedcover of the type having an electrical heater connected across an alternating current source of electrical power and distributed through the bedcover, said control means comprising:
   (a) a semiconductor control device including input and output power terminals connecting said device in electrical series with said heater, and said device further including a control terminal for permitting electrical current to flow between said input and output power terminals only during the remaining portion of each half cycle of alternating current applied across said power terminals after a predetermined signal pulse has been applied to said control terminal;
   (b) means to supply said signal pulse;
   (c) ambient temperature responsive means electrically connected to said control terminal through said signal pulse supplying means for varying the portion of each half cycle that said control device conducts inversely to changes in ambient temperature;
   (d) operator selector means electrically connected to said control terminal through said signal pulse supplying means for permitting an operator to manually vary the portion of each half cycle that said control device conducts current; and
   (e) overtemperature sensing means within the bedcover which is essentially an insulator at normal operating temperatures and a conductor of currents of control magnitude at an elevated temperature, said temperature sensing means being electrically connected to said control terminal through said signal pulse supplying means to prevent current flow between said input and output power terminals when an overtemperature condition exists in any portion of the bedcover.

4. The device as set forth in claim 3 wherein current flows between the input and output terminals of the semiconductor control device only during the remaining portion of each positive half cycle applied across said control terminals after a predetermined signal pulse has been applied to the control terminal.

5. The control means as set forth in claim 3 wherein said ambient temperature responsive means, said operator selector means and said overtemperature sensing means are connected to said control terminal through the medium of a triggering device, said triggering device having input and output electrodes and permitting electrical current flow between said electrodes to said control terminal only when a predetermined minimum potential exists across said electrodes, and said control means further includes means for applying said minimum potential across said terminals.

6. The device as set forth in claim 5 wherein said potential applying means includes a capacitor having a first terminal electrically connected to said output terminal of said semiconductor control device, and said capacitor having a second terminal electrically connected to said input electrode of said triggering device.

7. The device as set forth in claim 6 which further includes a rectifier in circuit with said triggering device for permitting electrical current to flow through said triggering device only in a single direction between said input and output electrodes.

8. The device as set forth in claim 3 wherein said semiconductor control device is a silicon controlled rectifier.

References Cited

UNITED STATES PATENTS

| | | | |
|---|---|---|---|
| 2,831,099 | 4/1958 | Crowley | 219—212 |
| 3,149,224 | 9/1964 | Horne et al. | 219—499 |
| 3,225,173 | 7/1968 | Cook et al. | 219—494 |

BERNARD A. GILHEANY, Primary Examiner

F. E. BELL, Assistant Examiner

U.S. Cl. X.R.

219—505